Figure 11:
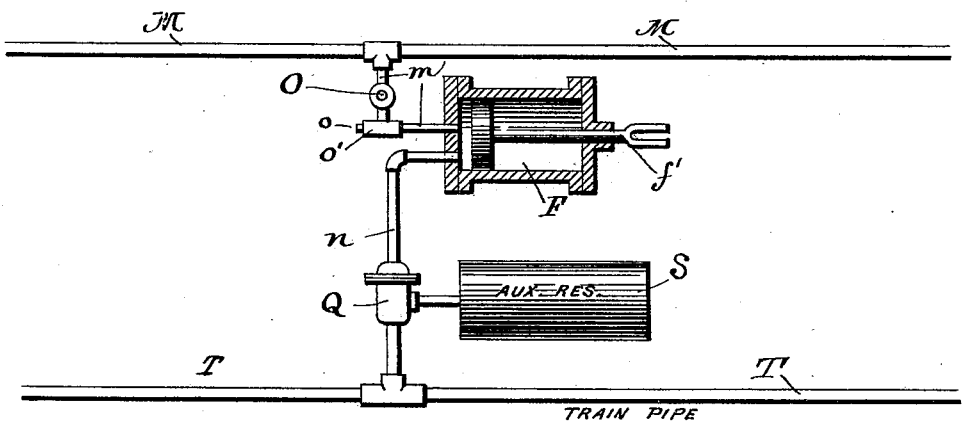

(No Model.) 3 Sheets—Sheet 1.
H. HINCKLEY.
SLACK ADJUSTER FOR AIR BRAKES.
No. 508,421. Patented Nov. 14, 1893.
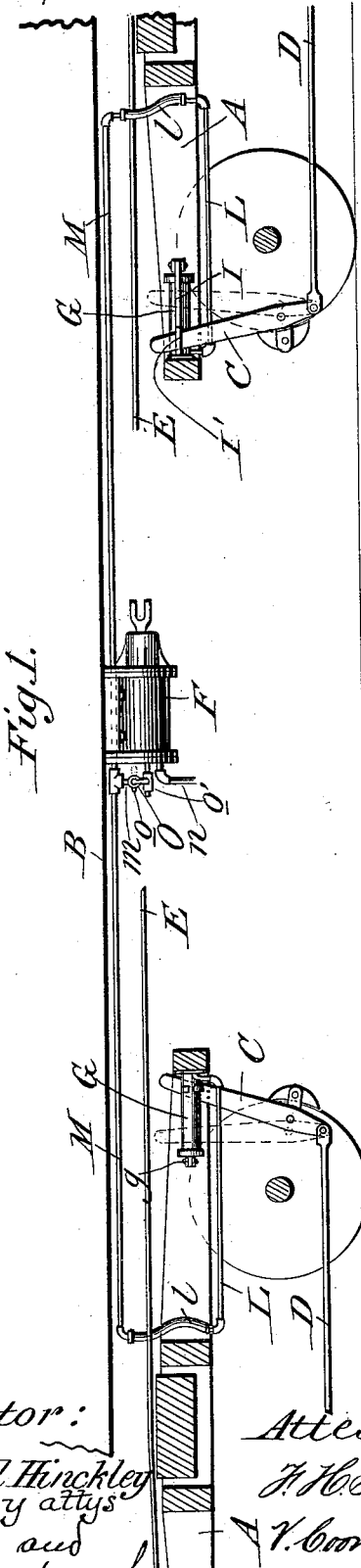
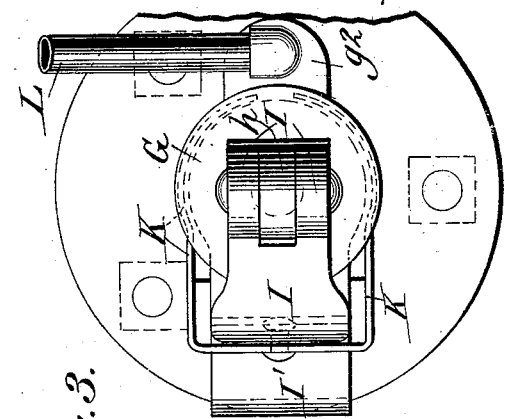
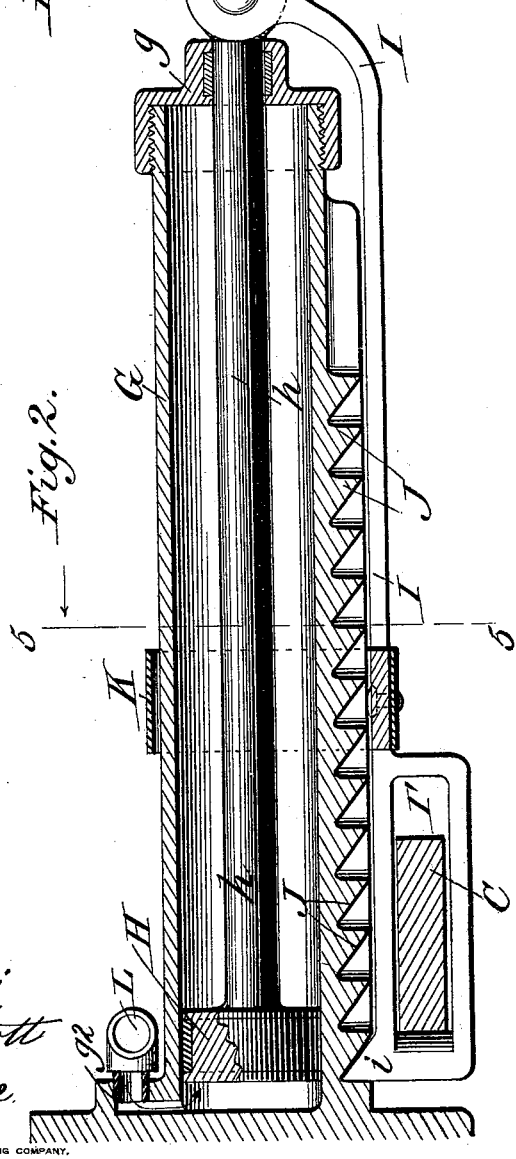
Inventor:
Howard Hinckley
by attys
Pennie and
Goldsborough
Attest:
F. H. Schott
V. Coombe (No Model.) 3 Sheets—Sheet 2.
H. HINCKLEY.
SLACK ADJUSTER FOR AIR BRAKES.
No. 508,421. Patented Nov. 14, 1893.
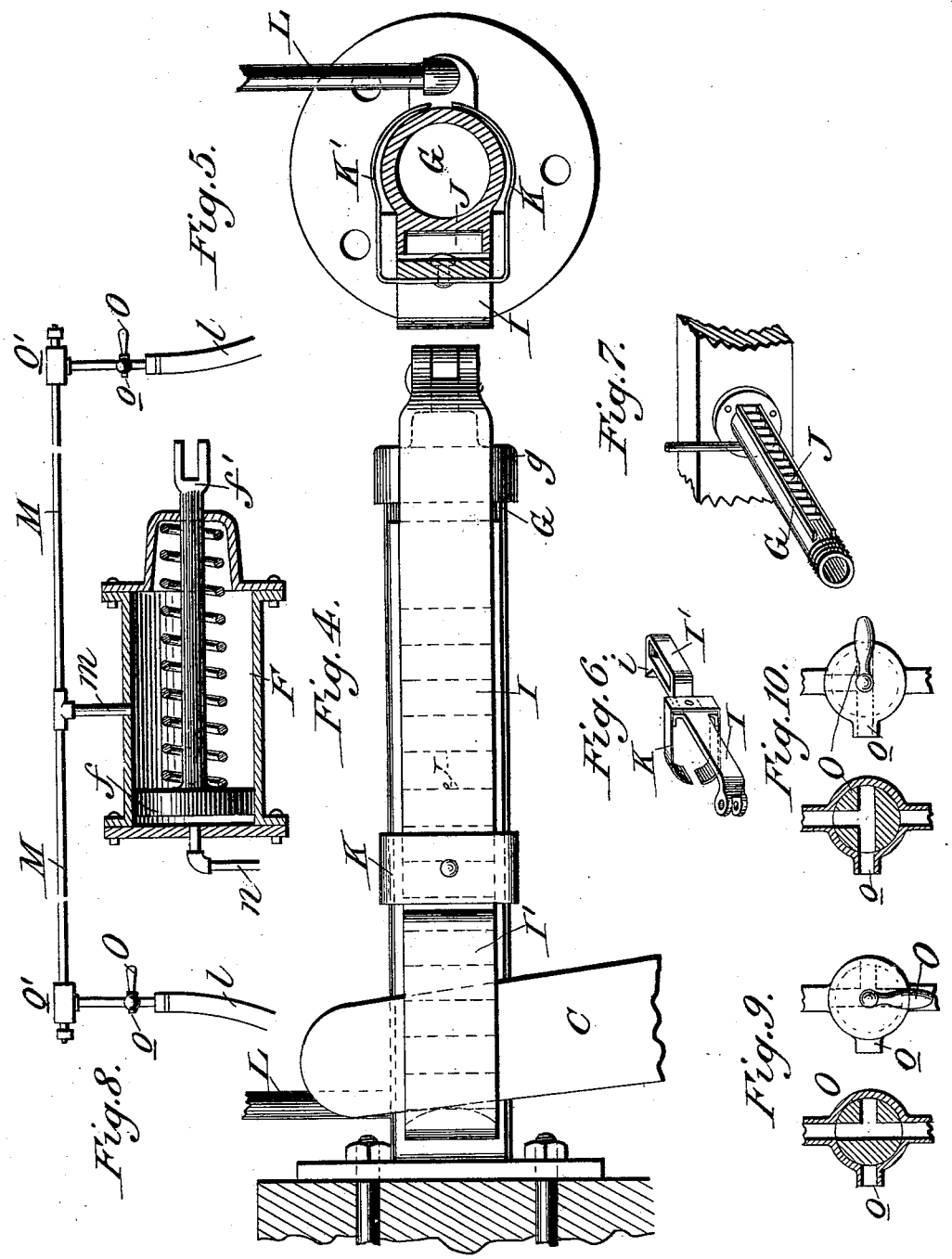
Attest:
F. H. Schott
Vinton Coombs
Inventor
Howard Hinckley:
by Pennie & Goldsborough
Attys.

(No Model.) 3 Sheets—Sheet 3.
H. HINCKLEY.
SLACK ADJUSTER FOR AIR BRAKES.

No. 508,421. Patented Nov. 14, 1893.

Attest:
F. H. Schott
A. M. Parkins

Inventor
Howard Hinckley
By Penner & Goldsborough
Attorneys

UNITED STATES PATENT OFFICE.

HOWARD HINCKLEY, OF TRENTON, NEW JERSEY.

SLACK-ADJUSTER FOR AIR-BRAKES.

SPECIFICATION forming part of Letters Patent No. 508,421, dated November 14, 1893.

Application filed July 28, 1893. Serial No. 481,740. (No model.)

*To all whom it may concern:*

Be it known that I, HOWARD HINCKLEY, a citizen of the United States, residing at Trenton, in the county of Mercer and State of New Jersey, have invented certain new and useful Improvements in Pneumatic Slack-Adjusters; and I do hereby declare the following to be a full, clear, and exact description of the invention, such as will enable others skilled in the art to which it appertains to make and use the same.

The invention herein relates to automatic slack adjusters for railway car brakes, such, for example, as those heretofore secured to me in patents granted December 15, 1891, No. 465,266; December 20, 1892, No. 488,314, and May 2, 1893, No. 496,606; and has particular reference to apparatus designed especially for use in connection with the Westinghouse or other air brake system.

There are principally two methods of automatically adjusting the slack in car brakes. One is by shifting or adjusting the fulcrum point of what is known as the dead lever in the system, as in my patents above referred to; and the other is by shortening up one or another of the connecting rods between the brake levers, as in other patents issued to me, for example, Nos. 475,014 and 475,015, dated May 17, 1892.

The present invention has reference to and operates upon the principle of the first named method, and has for its object to utilize the pressure in the air brake apparatus for effecting the adjustment of the dead lever fulcrum; and the invention consists in the means hereinafter described and claimed for accomplishing this result.

In the accompanying drawings, forming a part of this specification, Figure 1 is a side elevation, partly in section, illustrating the parts in operative position upon a car; Fig. 2 a longitudinal section of one of the devices for shifting the fulcrum of the dead lever; Fig. 3 an end view thereof; Fig. 4 a side view of the same; Fig. 5 a section on the line 5—5, Fig. 2; Figs. 6 and 7 detached perspective views of the means employed for locking the dead lever in its adjusted position; Fig. 8 a longitudinal, central, section of the brake cylinder, showing a modified arrangement; Figs. 9 and 10 detail views of the three-way cock.

Figure 12:
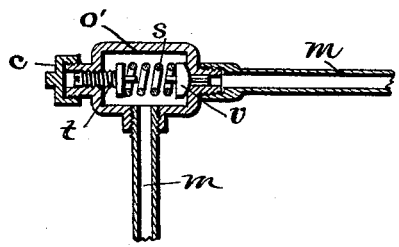

Fig. 11 is a plan view showing the relation of the adjuster to the air-brake apparatus; and Fig. 12 is a sectional detail illustrating a convenient form of adjustable check valve.

Referring by letters of reference to these drawings, A, A indicate ordinary truck frames, and B the bottom sill or frame of the usual car body.

C indicates what is termed the dead lever, there being a similar lever arranged at the opposite end of each truck and commonly known as the live lever.

D designates the connecting rod or pitman, connecting the lower ends of the brake levers together, and E indicates the draft rod by means of which the live lever is operated from the piston of the air cylinder, vacuum chamber, or other apparatus employed for applying the power to the brakes.

F denotes the air cylinder having the piston $f$, to the piston-rod $f'$ of which the draft rods E are connected in the usual manner.

S is the auxiliary reservoir, T the train pipe, Q the triple valve, and $n$ the pipe through which the reservoir communicates with the brake cylinder. As thus far described no novelty is claimed for the construction and arrangement of parts, the same being now well known in the art.

Instead of taking up the slack by adjusting the length of the connections, I propose in the present arrangement to adjust the fulcrums of the dead levers, and, while this adjustment is not broadly new for this purpose, I am not aware that it has ever been proposed to accomplish the same by air pressure through any such means as that embraced in my present invention. One arrangement for effecting this purpose is as follows:

G indicates a cylinder rigidly secured at one end to the framing of the truck, and provided with a piston H to which is secured a piston rod $h$ passing through a stuffing box $g$ secured to the outer end of said cylinder. To the outer end of the piston rod $h$ is pivotally secured one end of an arm I, the other end of said arm being provided with a beveled tooth $i$ adapted to engage a rack or series of similarly beveled teeth J formed upon the side of the cylinder G, and rigidly secured to said arm I is a bent spring K that embraces the cylinder G and operates to constantly maintain the beveled tooth $i$ in engagement with the rack J. The free end of the arm I is provided with a keeper I' in which rests the upper end of the dead lever and which constitutes its fulcrum. The fixed end of the cylinder G is provided with an inlet port $g^2$ to which is connected a pipe L, which in turn is connected by means of a tube $l$ to a pipe M. The pipe M, at its other end, is coupled to a short pipe $m$ communicating with the brake cylinder, said pipe $m$ being provided with a check valve $o'$, and at a point between said check valve and where it joins the pipe M, in the arrangement shown in Fig. 1 said pipe $m$ is provided with a three-way cock O and a vent $o$. The brake cylinder F is supplied with compressed air from the reservoir in the usual manner through the pipe $n$, and its piston is likewise secured to the draft rods.

The operation of the device is as follows: The brakes are applied by the engineer in the usual manner. When slack motion has resulted from any cause, and the air is let in to the cylinder F, the check valve in the pipe $m$ will permit a portion of the same to pass through the pipes M, $l$, and L, into the cylinder G, behind the piston H. Owing to the fact that the area of the brake cylinder piston is much greater than that of the piston of the adjuster cylinder, and also that the brake rods are under a tension of approximately two thousand pounds while the pressure behind the adjuster piston is only about one hundred and fifty pounds, no outward movement of the adjuster piston takes place until the brakes are released and the air pressure in the brake cylinder is let off. When this is done, the piston H is moved outward, carrying with it the arm I, in the keeper of which the dead lever is fulcrumed, thus shifting the fulcrum point of said lever, and compensating for the slack motion in a way now well understood. When the arm I is thus moved, the beveled tooth $i$ engages the rack J, and prevents any backward movement of the same due to the pressure of the dead lever when the brakes are applied. The check valve $o'$, which may be of any well known style or make, is preferably adjustable in order that it may be set so that only enough of the air brake pressure will be admitted into the adjuster cylinder to move the piston forward when too much slack exists. A convenient form of such valve is shown in Fig. 12, where $v$ denotes the valve proper, $s$ the spring holding the valve to its seat, and $t$ an adjusting screw for regulating the tension of the spring, a screw cap $c$ being preferably provided to keep out dust and dirt. The proper tension may be readily determined by applying the brakes a few times, when the adjuster cylinder is set up in position, and regulating or adjusting the check valve to suit the resistance found to exist at the upper end of the dead lever. The pressure required to throw the adjuster piston outward should be about what an ordinary workman could exert in pushing the upper end of the dead lever away from his body at a point about waist high. In order that the pressure from the brake cylinder may be entirely cut off from the adjuster cylinder, and also in order that the cylinder G may be "bled," and the dead lever fulcrum set back to its original position, I provide the three-way cock O, and vent $o$, arranged in the pipe $m$, as before described. When it is desired to shut off communication between the cylinders, owing to leakage in said cylinders or either of them, or to any disarrangement of the parts, the cock O is turned so as to shut off the passage of air through the pipe $m$, from the brake cylinder, and, should it be desired to slacken the levers to their fullest extent, as, for instance, when the brake shoes are to be renewed, the cock is turned so as to shut off communication between the pipe M and the brake cylinder, but at the same time open the vent $o$, whereby the cylinder of the adjuster is "bled" or relieved of all pressure, and the dead lever can then be swung back and easy access be had to the brake beams.

In the arrangement shown in Fig. 1, the adjuster cylinder is filled with air at every application of the brakes, whether any slack exists in the rigging or not. In Fig. 8, however, an arrangement is illustrated whereby the stroke to be maintained by the brake cylinder piston determines the position of the point of connection of the pipe $m$ with the cylinder. In the normal stroke of the brake piston, the opening of the pipe $m$ is not uncovered, but as the slack increases the movement of the piston also increases until it uncovers the opening of the pipe, when the brake cylinder is connected with the adjuster cylinder whose piston is then moved to take up the slack and restore the brake piston to its normal throw as before described. In this arrangement the check valve $o'$ is preferably located in the pipe M where it joins the pipe $l$.

I wish to be understood as not confining myself to the details of construction or arrangement of parts illustrated herein, as the invention is capable of modification in these respects without departing from its principle or scope.

Having thus described the invention, what I claim, and desire to secure by Letters Patent, is—

1. In a slack adjuster for railway brakes, the combination of a cylinder, a keeper secured to the piston of said cylinder, the keeper forming the fulcrum of the dead lever, and a pipe connection between the cylinder and the air brake apparatus; substantially as described.

2. In a slack adjuster for railway brakes, the combination of a cylinder, a piston working therein, a keeper connected with the piston rod, said keeper forming the fulcrum of the dead lever, and a pipe connection between the cylinder and the brake cylinder of the air brake apparatus; substantially as described.

3. In a slack adjuster for railway brakes, the combination of a cylinder, a piston working therein, a stop or keeper connected with the piston rod, said keeper forming the fulcrum of the dead lever, a pipe connection between the cylinder and the brake cylinder of the air brake apparatus, and a stop to prevent the reverse movement of the keeper; substantially as described.

4. In a slack adjuster for railway brakes, the combination of the cylinder G, a piston H working therein, a stop or keeper I' forming the fulcrum of the dead-lever, and an air pipe L connecting the cylinder with the air brake apparatus; substantiallly as described.

5. In a slack adjuster for railway brakes, the combination of the cylinder G, a piston H working therein, an arm I connected to the rod of said piston, a stop or keeper I' carried by said rod, said stop forming the fulcrum of the dead-lever, an air pipe L connecting the cylinder with the air brake apparatus, a fixed rack J, and a dog or tooth i carried by the arm I and taking into the rack; substantially as described.

6. In a slack adjuster for railway brakes, the combination of a cylinder mounted on the truck, a piston working in said cylinder, a stop or keeper forming the fulcrum for the dead-lever, said stop being connected with the piston, an air pipe forming communication between the cylinder and the brake cylinder of the air brake apparatus, and a check valve in the pipe connection; substantially as described.

In testimony whereof I affix my signature in presence of two witnesses.

HOWARD HINCKLEY.

Witnesses:
JOHN SWIM,
HENRY HARMEYER.